United States Patent
Lee et al.

(10) Patent No.: US 7,725,016 B2
(45) Date of Patent: *May 25, 2010

(54) LIQUID ZOOM LENS

(75) Inventors: Young Ho Lee, Yongin (KR); Jae Young Bae, Suwon (KR); Sung Chan Kim, Seoul (KR); Jin Hyuck Yang, Suwon (KR); Ha Yong Jung, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 795 days.

This patent is subject to a terminal disclaimer.

(21) Appl. No.: 11/590,916

(22) Filed: Nov. 1, 2006

(65) Prior Publication Data

US 2007/0104473 A1    May 10, 2007

(30) Foreign Application Priority Data

Nov. 1, 2005    (KR) .................. 10-2005-0103780

(51) Int. Cl.
    *G03B 17/00* (2006.01)
(52) U.S. Cl. ........................................ 396/79
(58) Field of Classification Search .......... 396/79; 359/665, 666
    See application file for complete search history.

(56) References Cited

U.S. PATENT DOCUMENTS

| | | | |
|---|---|---|---|
| 5,956,183 | A | 9/1999 | Epstein et al. |
| 6,369,954 | B1 | 4/2002 | Berge et al. |
| 7,382,545 | B2 * | 6/2008 | Jung et al. ............ 359/666 |
| 7,466,493 | B2 * | 12/2008 | Kim et al. ............ 359/666 |
| 2005/0041301 | A1 | 2/2005 | Kibayashi |
| 2005/0199720 | A1 | 9/2005 | Barkan |
| 2006/0152818 | A1 | 7/2006 | Shum et al. |

FOREIGN PATENT DOCUMENTS

| | | |
|---|---|---|
| DE | 103 49 467 A1 | 6/2005 |
| JP | 1996-258624 | 10/1996 |
| JP | 2002-341311 | 11/2002 |
| JP | 2006-48818 | 2/2006 |
| KR | 10-2005-0033308 | 4/2005 |

(Continued)

OTHER PUBLICATIONS

Japanese Office Action issued on Aug. 4, 2009 in corresponding Japanese Patent Application 2006-296450.

(Continued)

*Primary Examiner*—W. B. Perkey

(57) ABSTRACT

Disclosed herein is a liquid zoom lens. The liquid zoom lens comprises a cylindrical body including glass lenses respectively coupled at upper and lower openings to the body, an auto-focus lens part including a first liquid insulating layer and a first electrolyte layer stacked at a lower portion of the body to form an interface therebetween, and an optical zoom lens part including a second liquid insulating layer and a second electrolyte layer stacked on the first electrolyte layer to form an interface therebetween and a lens positioned in the second liquid insulating layer and fixed to the body with an outer peripheral surface of the lens closely contacting an inner peripheral surface of the body. The liquid zoom lens enables an auto-focus function and an optical zoom function to be performed simultaneously by means of a single liquid lens having a variable curvature.

13 Claims, 4 Drawing Sheets

FOREIGN PATENT DOCUMENTS

| WO | 2004/038480 | A1 | 5/2004 |
| WO | WO 2004/038480 | A1 | 5/2004 |
| WO | 2004/099847 | A1 | 11/2004 |
| WO | 2005/040865 | A1 | 5/2005 |

OTHER PUBLICATIONS

German Office Action issued Sep. 7, 2009 in corresponding German Patent Application 10 2006 049 426.1.

U.S. Patent Office Action, mailed Aug. 17, 2007, issued in U.S. Patent No. 7,382,545.

U.S. Patent Notice of Allowance, mailed Feb. 1, 2008, issued in U.S. Patent No. 7,382,545.

U.S. Patent Notice of Allowance, mailed Aug. 11, 2008, issued in U.S. Patent No. 7,466,493.

* cited by examiner

[FIG. 1] (PRIOR ART)
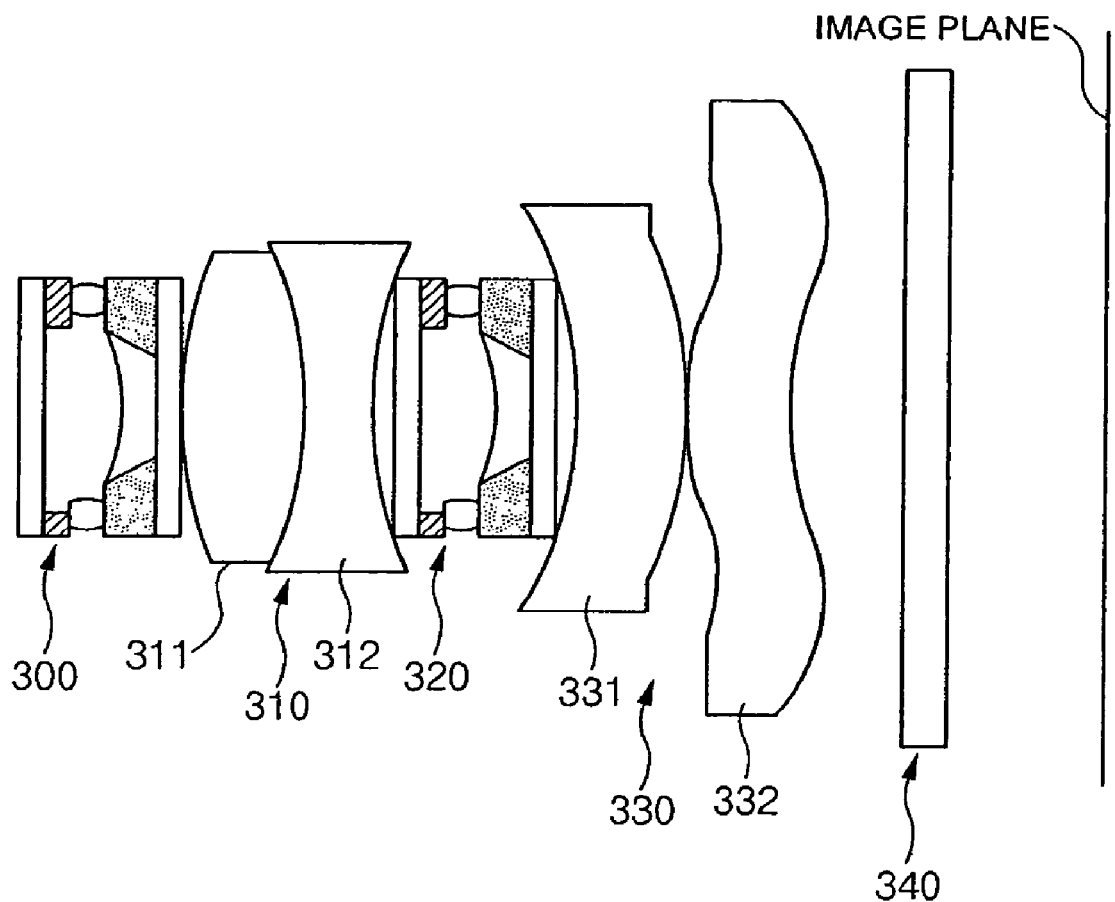
[FIG. 2] (PRIOR ART)
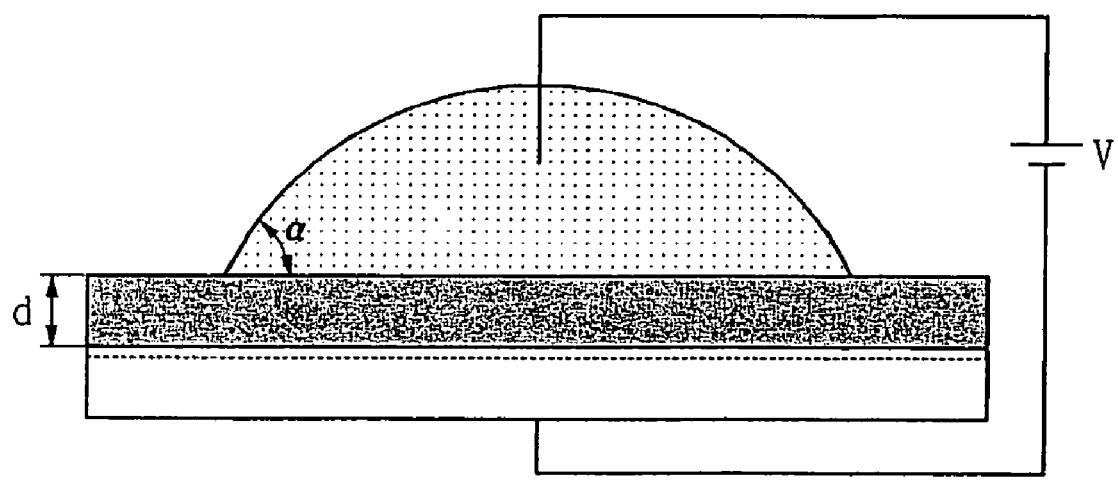

[FIG. 3]
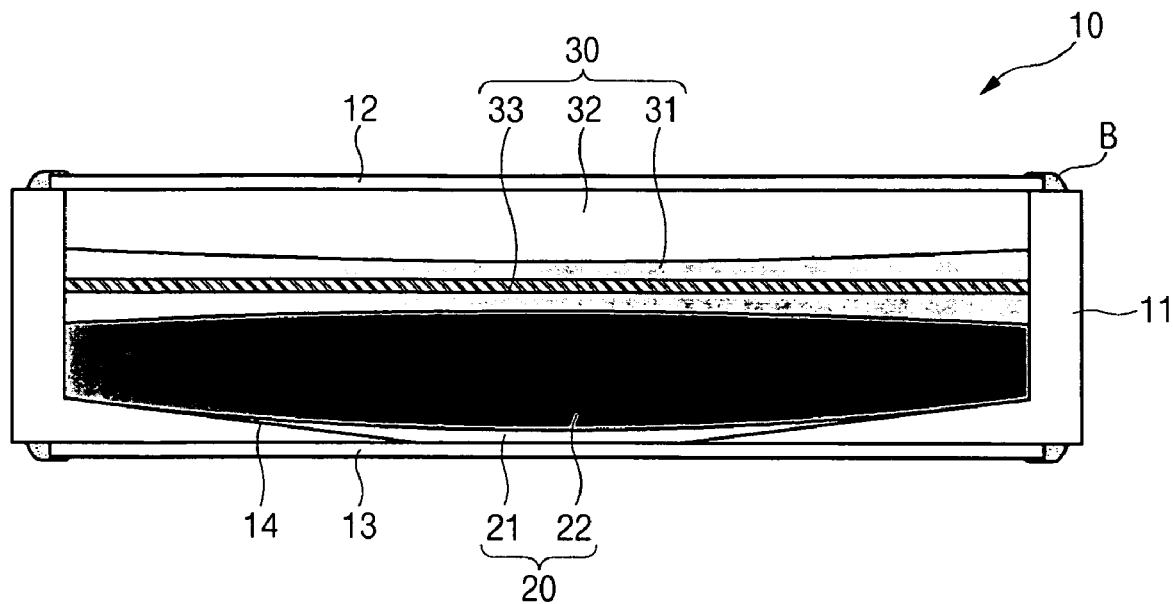
[FIG. 4]
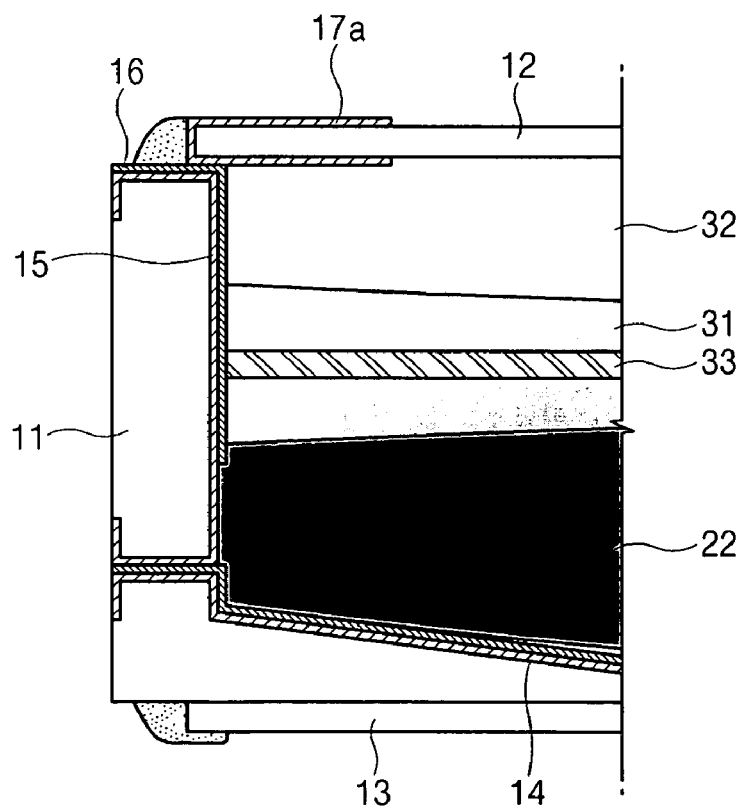

[FIG. 5]
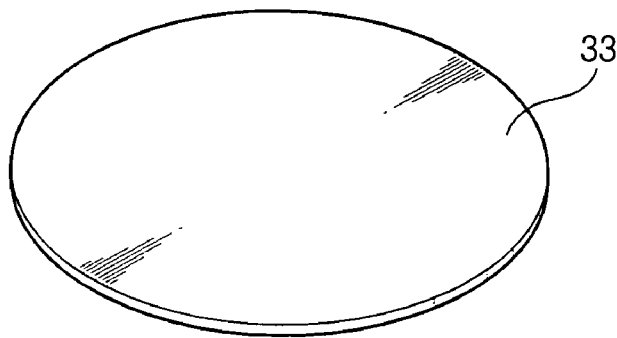
[FIG. 6A]
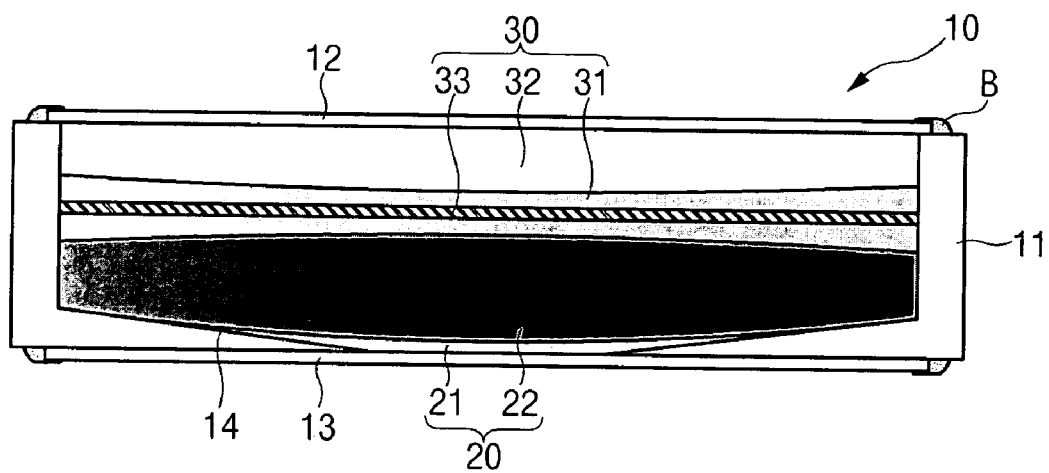
[FIG. 6B]
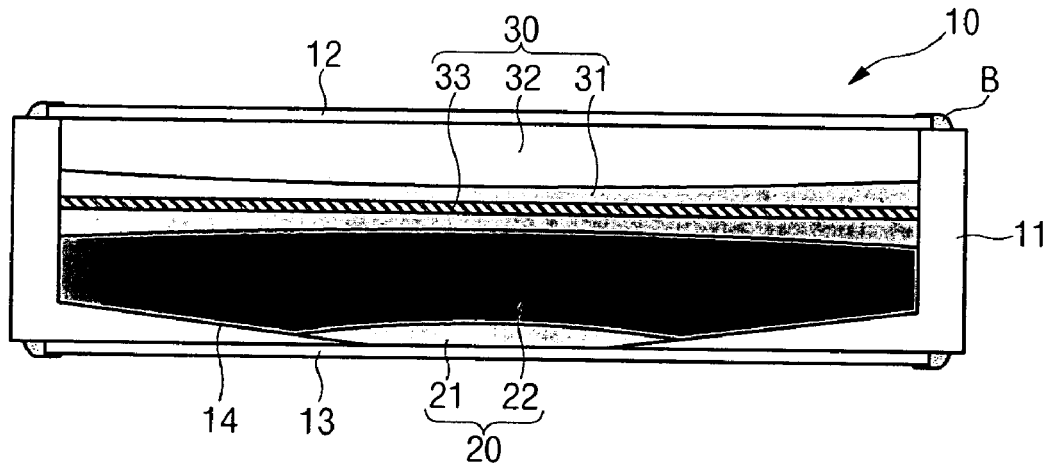

[FIG. 6C]
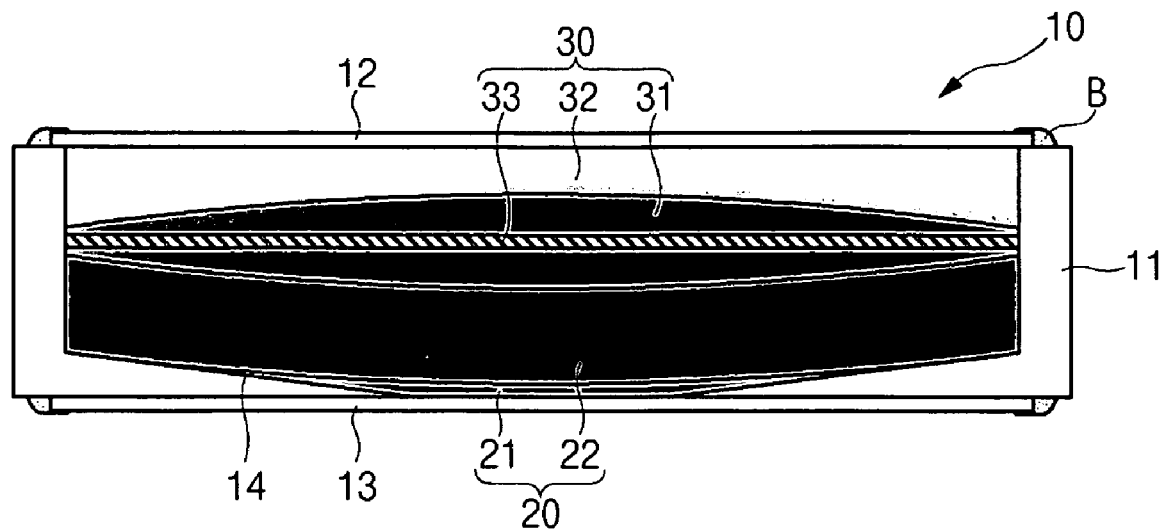
[FIG. 6D]
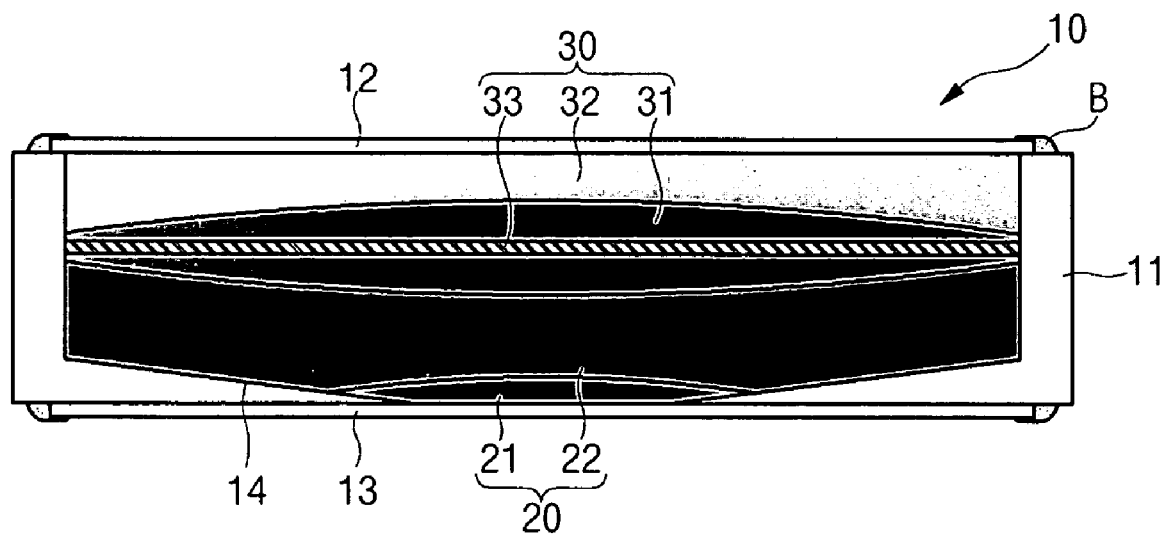

LIQUID ZOOM LENS

CROSS-REFERENCE TO RELATED APPLICATIONS

The application claims the benefit of Korea Patent Application No. 10-2005-0103780 filed with the Korea Intellectual Property Office on Nov. 1, 2005, the disclosure of which is incorporated herein by reference.

BACKGROUND OF THE INVENTION

1. Field of the Invention

The present invention relates to a liquid zoom lens. More particularly, the present invention relates to a liquid zoom lens, which includes a cylindrical body filled with electrolyte and insulating liquid therein to form a plurality of interfaces, each having a curvature changed by application of voltage, and a disk-shaped lens positioned in the electrolyte provided at an upper side to embody both optical zoom function and auto-focus function by variation in curvature of the interfaces resulting from the application of voltage to the interface of the electrolyte via electrodes formed of metal coating layers on the body.

2. Description of the Related Art

In recent years, as new types of mobile terminal, such as mobile cells or personal digital assistances (PDA), integrating a camera has been increasingly released in the market, a demand for a mobile terminal integrating a camera of a high pixel and various functions has been also growing. Such a mobile terminal camera comprises a lens affixed to an image pickup device such as charge coupled device (CCD), complementary metal oxide semiconductor (CMOS), and the like, and is configured to pick up an image of an object through the lens and to allow data of a picked-up image to be recorded by means of a predetermined recording medium.

In order to provide capability of a mega-pixel level to the camera according to a recent trend, the lens must be designed not only to have sufficient resolving power, but also to have a greater size than those of sensors in consideration of assembly tolerance.

For a lens system mounted to the mobile terminal and used to pick up the image of the object, it generally suffers from various kinds of aberration, such as spherical aberration, astigmatism, distortion aberration, etc. causing deformation of the shape or the morphology of the image of the object due to influence of incident light having various wavelengths, which is incident on the lens upon image pickup of the object. Thus, it is necessary to have implementation which can suppress occurrence of the aberration as much as possible.

Such a lens system can implement zoom in order to have a variable focal length. A zoom function of the lens system can be generally achieved by adjusting a distance between lenses via the relative movement between a front lens having a positive refractive index and a rear lens having a negative refractive index. For a general camera, a wide angle lens or a telephoto lens capable of changing a focal distance between an existing lens and an added lens is additionally affixed to the camera to maximize the zoom function, thereby allowing a user to take a picture at various viewing angles at one place without moving.

The zoom is generally divided into an optical zoom and a digital zoom. The optical zoom refers to a state where the image of the object is magnified by a variable focal distance by relatively moving an optical lens affixed to the camera. The digital zoom refers to a state where the image of the object is magnified in the CCD and displayed thereon, as an image is magnified in a graphic program such as Photo-Shop and the like.

For the digital zoom, the image of the object is magnified in the CCD, so that a space for movement of the lenses according to variation in focal distance is not necessary. As such, the digital zoom is advantageous in terms of miniaturization and compactness, but has a problem in that clear resolution cannot be achieved upon image pickup by the zoom operation.

On the contrary, for the optical zoom, the zoom operation is realized by virtue of the variation in focal distance between the lenses, thereby requiring the space for movement of the lenses according to the variation in focal distance. Hence, the optical zoom is disadvantageous in that it requires a large space for a lens part and a lens barrel surrounding the lens part. However, it can be preferred to the digital zoom by consumers due to its merits in clear resolution upon the zoom operation, irrespective of its disadvantage of increasing the volume of the mobile terminal.

Nevertheless, a recent tendency of miniaturization and compactness in the market requires a decrease in space for changing the focal distance, and thus, manufacturers have mainly released mobile terminals which incorporate the digital zoom function therein rather than the optical zoom function. In recent years, the optical zoom type mobile terminals have also been released, which can embody the optical zoom function through a rear side of the mobile terminal.

Korean Patent Application No. 2003-0003984 discloses one of conventional mobile terminals which can embody the optical zoom function. The mobile terminal of the disclosure has an improved lens barrel structure for an optical zoom applicable to the digital camera and the like, and comprises a zoom camera, which has a small size and high resolution and can be easily manufactured, and which comprises a zoom lens assembly with the lens barrel structure.

The zoom lens assembly comprises a front lens, a rear lens having a negative refractive index, an inner barrel which has a helicoid groove formed along a surface of the inner barrel to guide a helical movement of the front and rear lenses, and an outer barrel capable of being inserted along the surface of the inner barrel and having an escape groove formed on an inner surface of the outer barrel to guide a vertical movement of the front and the rear lenses.

With the zoom camera constructed as above, the inner and outer barrels are positioned at one side of the mobile terminal in a telescopic manner such that a focal distance of the zoom camera can vary in relation to the movement between the lenses as the inner and outer barrels are sequentially spread out by driving of a motor inside the terminal, thereby realizing the optical zoom function. Consequently, the zoom camera of the disclosure has a disadvantage in that it requires a large space for the zoom operation within the camera.

In addition, since the motor of the camera is inevitably operated in such a way so as to push the inner and outer barrels having the plural lenses received therein to an outside of the zoom camera, loss of power during driving of the motor causes an increase in power consumption of a battery.

In order to solve the problems as mentioned above, a liquid lens has been developed, which occupies a small space within the mobile terminal and does not suffer from power consumption. The liquid lens comprises a electrolyte and an insulating liquid in a single lens barrel to form an interface therebetween, of which curvature is changed by application of voltage to the electrolyte through the lens barrel, in order to embody the zoom function.

One of the liquid lenses capable of embodying the zoom function is disclosed in Korean Patent Laid-open Publication No. 2005-0033308, entitled "Zoom camera using the liquid lens for mobile phone, control system and method thereof," which will be described hereinafter with reference to FIG. 1.

FIG. 1 is a cross-sectional view of a conventional liquid lens. Referring to FIG. 1, the conventional liquid lens includes a first group of lenses 310 composed of a first lens 311 with a positive refractive index and a second lens 312 with a negative refractive index, a first liquid lens 300 having an interface formed between a conductive liquid and a non-conductive liquid and varied in curvature in response to a control signal for a zoom function, a second group of lenses 330 composed of a third lens 331 having both aspherical sides with a positive refractive index and a fourth lens 332 having both aspherical sides with a negative refractive index, and an infrared filter 340 spaced a predetermined distance from the second group of lenses 330.

As shown in FIG. 2, the conventional liquid lens of the disclosure is operated on the basis of an electrowetting phenomenon, wherein the electrowetting phenomenon is caused by variation of the contact angle $\alpha$ resulting from change in surface tension of an interface by movement of charges residing on the interface. In particular, a thin insulating member is positioned on the interface to allow the interface to have a high potential difference, and the charges in the electrolyte have characteristics of moving towards an upper surface of the interface due to chemical properties.

At this point, when an electric field is applied to the interface from the outside, the characteristics of the charges are further intensified, and the concentration of the charges is significantly increased at a triple contact line where the interfaces overlap each other, increasing repulsive force between the charges, so that the surface tension is lowered at a corner of a liquid droplet.

Since the electrowetting phenomenon can be used to easily control a minute amount of liquid and fine particles in the liquid, various investigations have been undertaken in recent years for application of the electrowetting phenomenon to a variety of products, for example, liquid lenses, micro pumps, display devices, optical devices, micro electro mechanical systems (MEMS), etc.

In particular, a liquid lens for auto-focus can have improved characteristics in view of small size, low power consumption and rapid response rate, compared with a conventional mechanical driving type lens.

The liquid lens constructed as above can embody the zoom function by virtue of the variation in curvature of the interface between the conductive liquid and the non-conductive liquid of the individual liquid lens within the single lens barrel in which the plural groups of lenses and the liquid lens are received, thereby solving the problem of spatial restriction by the conventional optical zoom lens which employs the telescopic lens barrel. However, irrespective of these merits, the conventional liquid lens has a problem in that the single liquid lens performs only the zoom function by the variation in curvature between the liquids contained in the barrel.

Furthermore, the conventional liquid lens has a problem of making the structure of the camera complicated. In particular, in order to allow the camera comprising the liquid lens to embody other functions, for example, an auto-focus (A/F) adjustment function, as well as the zoom function, an additional liquid lens to act as a front lens must be affixed to the camera, making the structure of the camera more complicated.

SUMMARY OF THE INVENTION

An advantage of the present invention is that it provides a liquid zoom lens, which comprises a cylindrical body filled with electrolyte and insulating liquid therein to form a plurality of interfaces therebetween, each having a curvature changed by application of voltage to the electrolytes via electrodes connected with the electrolytes to embody both optical zoom function and auto-focus function at the same time by virtue of the variation in curvature of the interfaces.

Additional aspects and advantages of the present general inventive concept will be set forth in part in the description which follows and, in part, will be obvious from the description, or may be learned by practice of the general inventive concept.

According to an aspect of the invention, the above and other objects can be accomplished by the provision of a liquid zoom lens, comprising: a cylindrical body having a pair of glass lenses respectively coupled at upper and lower openings of the body; an auto-focus lens part including a first liquid insulating layer and a first electrolyte layer stacked at a lower portion of the body to form an interface therebetween; and an optical zoom lens part including a second liquid insulating layer and a second electrolyte layer stacked on the first electrolyte layer to form an interface therebetween, and a disk-shaped lens positioned in the second liquid insulating layer.

The body is inserted into a mobile terminal in which, with the glass lenses of a disc shape respectively bonded to the upper and lower openings of the body, the plurality of liquid layers and the lenses are received in the body to form the plurality of interfaces therebetween.

The body may be formed from the same material as that of a frame of the mobile terminal or from materials such as metal or ceramics. An inner circumferential surface of the body and a portion of the upper glass lens are formed of metal coating layers, which can act as an electrode. Here, the metal coating layers are preferably formed of Au, which has a low reactivity with respect to liquid.

In addition, the auto-focus lens part and the optical lens part are sequentially stacked in the body while forming the plurality of interfaces in a multilayered structure of the electrolyte layers and the liquid insulating layers, with the disk-shaped lens of a glass or plastic material located at an intermediate region of the second electrolyte layer in the optical lens part and fixed to the body.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a cross-sectional view of a conventional liquid lens;

FIG. 2 is a conceptual view illustrating an electrowetting phenomenon which can be applied to a liquid lens;

FIG. 3 is a cross-sectional view of a liquid zoom lens according to the present invention;

FIG. 4 is an enlarged cross-sectional view of one side of a body of the liquid zoom lens according to the present invention;

FIG. 5 is a perspective view illustrating a lens, which is fixed in a second electrolyte layer for an optical zoom lens part of the liquid zoom lens according to the present invention; and FIGS. 6a to 6d are cross-sectional views illustrating operational procedures of the liquid zoom lens according to the present invention, wherein FIG. 6a is a cross-sectional view illustrating an initial operation state of the liquid zoom lens before application of voltage, FIG. 6b is a cross-sectional view illustrating the liquid zoom lens upon application of the voltage to an auto-focus lens part at a lower portion of the liquid zoom lens, FIG. 6c is a cross-sectional view illustrating the liquid zoom lens upon application of the voltage to an optical zoom lens part at an upper portion thereof, and FIG. 6d is a cross-sectional view illustrating the liquid zoom lens when the voltage is simultaneously applied to both the auto-focus lens part and the optical zoom lens part.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, preferred embodiments of the present invention will be described in detail with reference to the accompanying drawings.

Structure of Liquid Zoom Lens

FIG. 3 is a cross-sectional view of a liquid zoom lens according to the present invention, and FIG. 4 is an enlarged cross-sectional view of one side of a body of the liquid zoom lens according to the present invention. Referring to FIGS. 3 and 4, a liquid zoom lens 10 according to the present invention comprises a cylindrical body 11, which has glass lenses 12 and 13 (also referred to as "upper" and "lower" glasses) respectively bonded to upper and lower openings of the body 11, and which is provided therein with an auto-focus lens part 20 and an optical lens part 30, both of which comprises a plurality of electrolyte layers 22 and 32, and a plurality of liquid insulating layers 21 and 31 sequentially stacked to form a plurality of interfaces within the body 11. The electrolyte layers 22 and 32 and the liquid insulating layers 21 and 31 have different properties.

The body 11 is formed from a metallic or ceramic material, and has a bottom surface which is slanted downward to the center of the bottom surface, and referred to as a slanted surface 14 herein. The body 11 is formed with the upper and lower openings, and comprises the glass lenses 12 and 13, which are bonded to upper and lower ends of the body 11 by adhesives B applied to outer peripheries of the glass lenses 12 and 13 so as to cover the upper and lower openings, respectively.

The slanted surface 14 of the body 11 serves to fix a first liquid insulating layer 21 at the center of the body 11 where the first liquid insulating layer 21 is positioned at the lowermost location, in order to reduce the overall size of the auto-focus lens part 20 when the interface between the layers 21 and 22 is bent by the application of voltage.

The body 11 is provided at the lower portion with the auto-focus lens part 20, which comprises the first liquid insulating layer 21 and a first electrolyte layer 22 stacked to form an interface therebetween, with the circumferences of the layers 21 and 22 contacting the slanted surface 14 of the body 11. The layers 21 and 22 are composed of transparent liquid, which cannot be mixed with each other, and have different properties and an equal density.

With the auto-focus lens part 20, an auto-focus function is performed in such a way that the first liquid insulating layer 21 becomes convex by variation in curvature of the first electrolyte layer 22 forming an interface with the first liquid insulating layer 21 located at the lowermost location in the body 11, when voltage is applied to the first electrolyte layer 22.

The optical lens part 30 is stacked on the auto-focus lens part 20 in the body 11. The optical lens part 30 comprises a second liquid insulating layer 31 and a second electrolyte layer 32, which are stacked to form an interface therebetween and composed of liquids with different properties. The optical lens part 30 further comprises a lens 33, which is located at an intermediate region of the second liquid insulating layer 31, and fixed to the body 11 with an outer peripheral surface of the lens 33 closely contacting an inner peripheral surface of the body 11.

With the optical lens part 30, an optical zoom function is performed in such a way that upper and lower sections of the second liquid insulating layer 31 become convex, with the lens 33 interposed between upper and lower sections of the second liquid insulating layer 31, as the second electrolyte layer 32 is symmetrically bent by application of the voltage to the second electrolyte layer 32.

Preferably, the lens 33 fixed to the body 11 in the second electrolyte layer 32 is formed of a disk-shaped glass or plastic lens, and has hydrophobic coating films formed on both sides of the lens 33.

The hydrophobic coating films of the lens 33 serve to allow the second liquid insulating layer 31 surrounding the lens 33 in an oil state to be easily adsorbed to the surface of the lens 33, causing the lens 33 to be stably held in the insulating liquid, so that the second liquid insulating layer 31 can behave stably in a symmetrical state upon operation for the optical zoom function.

Although the liquid insulating layers 21 and 31 and the electrolyte layers 22 and 32 are stacked to form the plural interfaces in the auto-focus lens part 20 and the optical lens part 30, respectively, the liquid insulating layers 21 and 31 have different characteristics from those of the electrolyte layers 22 and 32. Specifically, the electrolyte layers 22 and 32 contain water as a main component, and an inorganic salt and a polar solvent as subsidiary components. On the other hand, the liquid insulating layer 21 and 31 contain silicon oil as a main component, and a non-polar solvent as a subsidiary component. Hence, when the electrolyte layer is brought into contact with the liquid insulating layer, they are not mixed with each other, and constitute the interface having a predetermined curvature.

In addition, although the first and second electrolyte layers 22 and 32 have the same compositions, liquid for the first electrolyte layers 22 has the different properties from those of the second electrolyte layer 32 due to different contents of the compositions. Likewise, although the first and second liquid insulating layers 21 and 31 have the same compositions, liquid for the first liquid insulating layer 21 has the different properties from those of the second liquid insulating layer 31. In particular, the liquid of the second liquid insulating layer 31 has a higher wettability than that of the first liquid insulating layer 21.

The electrolyte and the insulating liquid forming the plural interfaces have substantially the same density. Basically, the electrolyte is kept at a refractive index of 1.4 or less, and the insulating liquid is kept at a refractive index of 1.45 or more. In this regard, as a difference in refractive index between the electrolyte and the insulating liquid is higher, it is more advantageous for the liquid lens.

As shown in FIG. 4, for the liquid zoom lens 10 of the present invention, the body 11 and the upper glass lens 12 are partially formed with metal coating layers 15, which can act as an electrode. Here, each of the metal coating layers 15 is mainly formed of Au, which has a low reactivity with respect to various kinds of liquid, by a surface coating process.

In addition, a parylene coating film 16 is formed on the metal coating layers 15 so as to serve as an insulating film, thereby forming a plurality of insulating interfaces with respect to the various liquids. At this point, the surface of the upper glass lens 12 is formed with an extending coating film 17a through which voltage is applied to the second electrolyte layer 32. As a result, when electrical signals are applied to the body 11, the electrical signals are applied to the second electrolyte layer 32 via the coating film 17a which is connected with the second electrolyte layer 32.

FIG. 5 is a perspective view illustrating the lens which is located in the second liquid insulating layer for the optical zoom lens part of the liquid zoom lens according to the present invention. As shown in FIG. 5, the lens 33 has a disk shape, and is formed from glass or plastic. The lens 33 is surrounded by the second liquid insulating layer 31, with the outer peripheral surface of the lens 33 closely contacting the inner peripheral surface of the body 11.

The lens 33 is coated at both sides with the hydrophobic coating films which serve to allow the second electrolyte layer 31 surrounding the outer surface of the lens 33 to be easily adsorbed to the outer surface of the lens 33. Alternatively, the lens 31 may have the same coating layer as that on the inner peripheral surface of the body 11.

Operation of Liquid Zoom Lens

FIGS. 6a to 6d are cross-sectional views illustrating an operation procedure of the liquid zoom lens according to the present invention, wherein FIG. 6a is a cross-sectional view illustrating an initial operation state of the liquid zoom lens before application of voltage, FIG. 6b is a cross-sectional view illustrating the liquid zoom lens upon application of the voltage to an auto-focus lens part at a lower portion of the liquid zoom lens, FIG. 6c is a cross-sectional view illustrating the liquid zoom lens upon application of the voltage to an optical zoom lens part at an upper portion thereof, and FIG. 6d is a cross-sectional view illustrating the liquid zoom lens when the voltage is simultaneously applied to both the auto-focus lens part and the optical zoom lens part.

Referring to FIG. 6a, in an initial state wherein voltage is not applied to the liquid zoom lens, the first liquid insulating layer 21 of the auto-focus lens part 20 and the second liquid insulating layer 31 of the optical lens part 30 are kept in the thinnest state. At this time, the first and second electrolyte layers 22 and 32 form interfaces having predetermined curvatures with the first and second liquid insulating layers 21 and 31, respectively.

Referring to FIG. 6b, when the voltage is applied to the auto-focus lens part 20 positioned at the lower section of the body 11 for an auto-focus operation of the liquid zoom lens in the initial state of FIG. 6a, electric current flows to the metal coating layer 15 free from the parylene coating film 16 on the inner peripheral surface of the body 11, and drives the first electrolyte layer 22, which forms the interface with the first liquid insulating layer 21, thereby changing the curvature of the interface therebetween. As a result, the first liquid insulating layer 21, which has a lower surface in contact with the lower glass lens 13, is bent as much as the variation in curvature of the first liquid electrolyte layer 22, thereby allowing the operation of the auto-focus lens part 20.

Here, a difference in refractive index between two liquids forming the first liquid insulating layer 21 and the first electrolyte layer 22 is in the range of 0.05~0.1. If the difference in refractive index is 0.1 or more, it is difficult to provide a correct focal point in a zoom operation, since it deviates from a focal distance of auto-focus. On the other hand, if the difference is 0.05 or less, a variation in curvature of the interface between the layers is so negligible that it is difficult to bring an object into focus.

FIG. 6c is a cross-sectional view illustrating the optical lens part 30 of the liquid zoom lens in a driving state. When the voltage is applied to the electrodes formed on the inner peripheral surface of the body 11, it is supplied to the extending coating film 17a formed on a portion of the upper glass lens 12 through the metal coating layer 15 on the body 11, thereby driving the optical lens part 30. Then, the second electrolyte layer 32 on the first electrolyte layer 22 is driven, and causes a change in curvature of the interface with the second liquid insulating layer 31. Accordingly, the second electrolyte layer 32 is bent convexly on the lens 33 by a degree of the variation in curvature of the interface, thereby allowing the operation of the optical lens part 30.

It is possible to provide optical zoom magnifications of ×1, ×2, ×3 and the like according to the degree of the variation in curvature of the interface formed between the second liquid insulating and electrolyte layers 31 and 32.

Here, a difference in refractive index between two liquids forming the second liquid insulating layer 31 and the second electrolyte layer 32 is in the range of 0.08~0.15. If the difference in refractive index is 0.15 or more, it is difficult to provide a correct focal point in an auto-focus zoom operation due to an excessive zoom operation deviating from a preset range. On the other hand, if the difference is 0.08 or less, it is difficult to perform a satisfactory zoom function due to a negligible variation in curvature of the interface between the layers.

Lastly, FIG. 6d shows the liquid zoom lens when both the auto-focus lens part 20 and the optical zoom lens part 30 in the body 11 are operated at the same time. When the voltage is supplied to the extending coating film 17a and the metal coating layer 15 exposed on the inner surface of the body 11 through the parylene coating film 16 at the same time, the first and second electrolyte layers 22 and 32 are driven simultaneously, which causes variation in curvatures of the electrolyte layers forming the interfaces with the liquid insulating layers, allowing the optical zoom function and the auto-focus function to be performed at the same time.

With the liquid zoom lens constructed as above, the liquid insulating layers 21 and 31 and the electrolyte layers 22 and 32 constitute the auto-focus lens part 20 and the optical lens part 30 together while forming the plurality of interfaces in a multilayered structure within the cylindrical body 11, in which the glass or plastic lens 33 is positioned in the optical lens part 30, such that the interfaces formed by the liquid insulating layers 21 and 31 and the electrolyte layers 22 and 32 are bent in predetermined radii of curvatures by voltage applied to the respective lens parts 20 and 30, thereby allowing the optical zoom function and the auto-focus function to be simultaneously performed by the auto-focus lens part 20 and the optical lens part 30 of the single liquid lens.

As apparent from the above description, according to the present invention, the liquid zoom lens comprises electrolytes and insulating liquids filled in a predetermined sequence to form a plurality of interfaces in a single cylindrical body such that curvatures of the interfaces resulting from a difference in refractive index between the electrolytes and insulating liquids can be changed by application of voltage to the electrolytes through electrodes on the body, thereby allowing an auto-focus function and an optical zoom function to be embodied at the same time. In addition, the liquid zoom lens comprises hydrophobic coating films formed on both sides of a lens positioned in an optical zoom lens part to hold the insulating liquid for a zoom operation surrounding the lens, thereby allowing the zoom function to be performed stably.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A liquid zoom lens comprising:
   a cylindrical body including a pair of glass lenses respectively coupled at upper and lower openings to the body;
   an auto-focus lens part including a first liquid insulating layer and a first electrolyte layer stacked at a lower portion of the body to form an interface therebetween; and
   an optical zoom lens part including a second liquid insulating layer and a second electrolyte layer stacked on the first electrolyte layer to form an interface therebetween, and a lens positioned in the second liquid insulating layer and fixed to the body with an outer peripheral surface of the lens closely contacting an inner peripheral surface of the body.

2. The liquid zoom lens according to claim 1,
   wherein the body is formed of a metallic or ceramic material, and has a bottom surface slanted downward to the center of the bottom surface.

3. The liquid zoom lens according to claim 1,
   wherein the second liquid insulating layer and the second electrolyte layer of the optical zoom lens part are formed of liquids having different properties to form the interface therebetween, the second electrolyte layer is positioned on the second liquid insulating layer, and the tens is fixed to the body while being located at an intermediate region of the second electrolyte layer.

4. The liquid zoom lens according to claim 3,
   wherein the lens is a disk-shaped glass lens.

5. The liquid zoom lens according to claim 3,
   wherein the lens is a disk-shaped plastic lens of a COC- or PC-based plastic material.

6. The liquid zoom lens according to claim 3,
   Wherein the lens comprises hydrophobic coating films formed on both sides thereof.

7. The liquid zoom lens according to claim 1,
   wherein the body comprises a metal coating layer on an inner peripheral surface, the metal coating layer being formed by coating Au.

8. The liquid zoom lens according to claim 7,
   wherein a parylene coating film is formed on the metal coating layer of the inner peripheral surface of the body to form an insulating surface with the plurality of liquids.

9. The liquid zoom lens according to claim 7,
   wherein an extending coating film is formed on a portion of the surface of the glass so as to deliver a voltage applied to the second electrolyte layer.

10. The liquid zoom lens according to claim 1,
    wherein a difference in refractive index between two liquids composing the first liquid insulating layer and the first electrolyte layer is in the range of 0.05 .about. 0.1.

11. The liquid zoom lens according to claim 1,
    wherein a difference in refractive index between two liquids composing the second liquid insulating layer and the second electrolyte layer is in the range of 0.08 .about. 0.15.

12. The liquid zoom lens according to claim 1,
    wherein each electrolyte layer contains water as a main component, and an inorganic salt and a polar solvent as subsidiary components.

13. The liquid zoom lens according to claim 1,
    wherein each liquid insulating layer contains silicon oil as a main component, and a non-polar solvent as a subsidiary component.

* * * * *

UNITED STATES PATENT AND TRADEMARK OFFICE
CERTIFICATE OF CORRECTION

| | | |
|---|---|---|
| PATENT NO. | : 7,725,016 B2 | |
| APPLICATION NO. | : 11/590916 | |
| DATED | : May 25, 2010 | |
| INVENTOR(S) | : Young Ho Lee et al. | |

It is certified that error appears in the above-identified patent and that said Letters Patent is hereby corrected as shown below:

Column 9, Line 38 delete "tens" and insert --lens--.

Column 10, Line 7 delete "Wherein" and insert --wherein--.

Signed and Sealed this

Fourth Day of January, 2011

David J. Kappos
*Director of the United States Patent and Trademark Office*